Patented Apr. 21, 1931

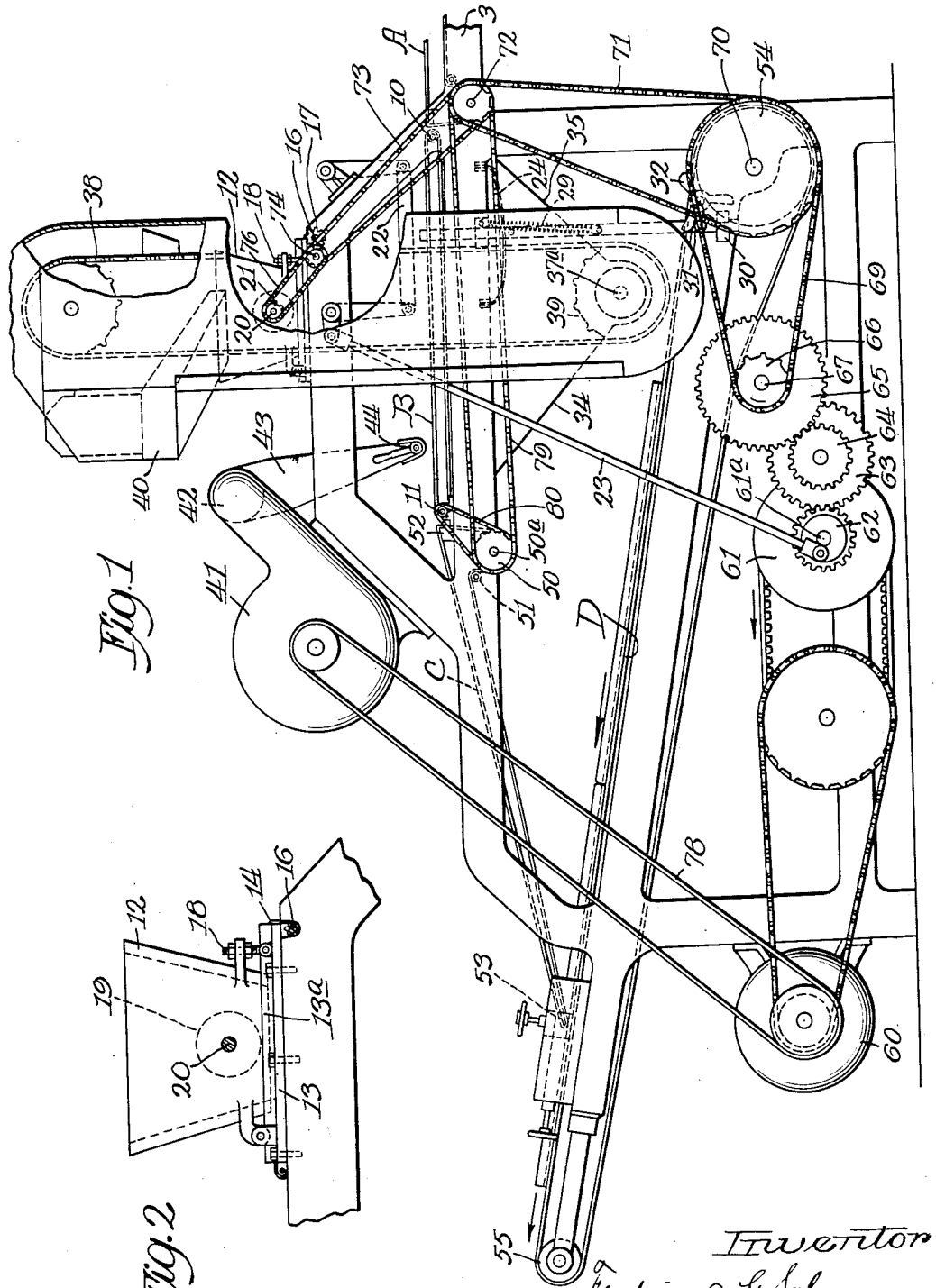

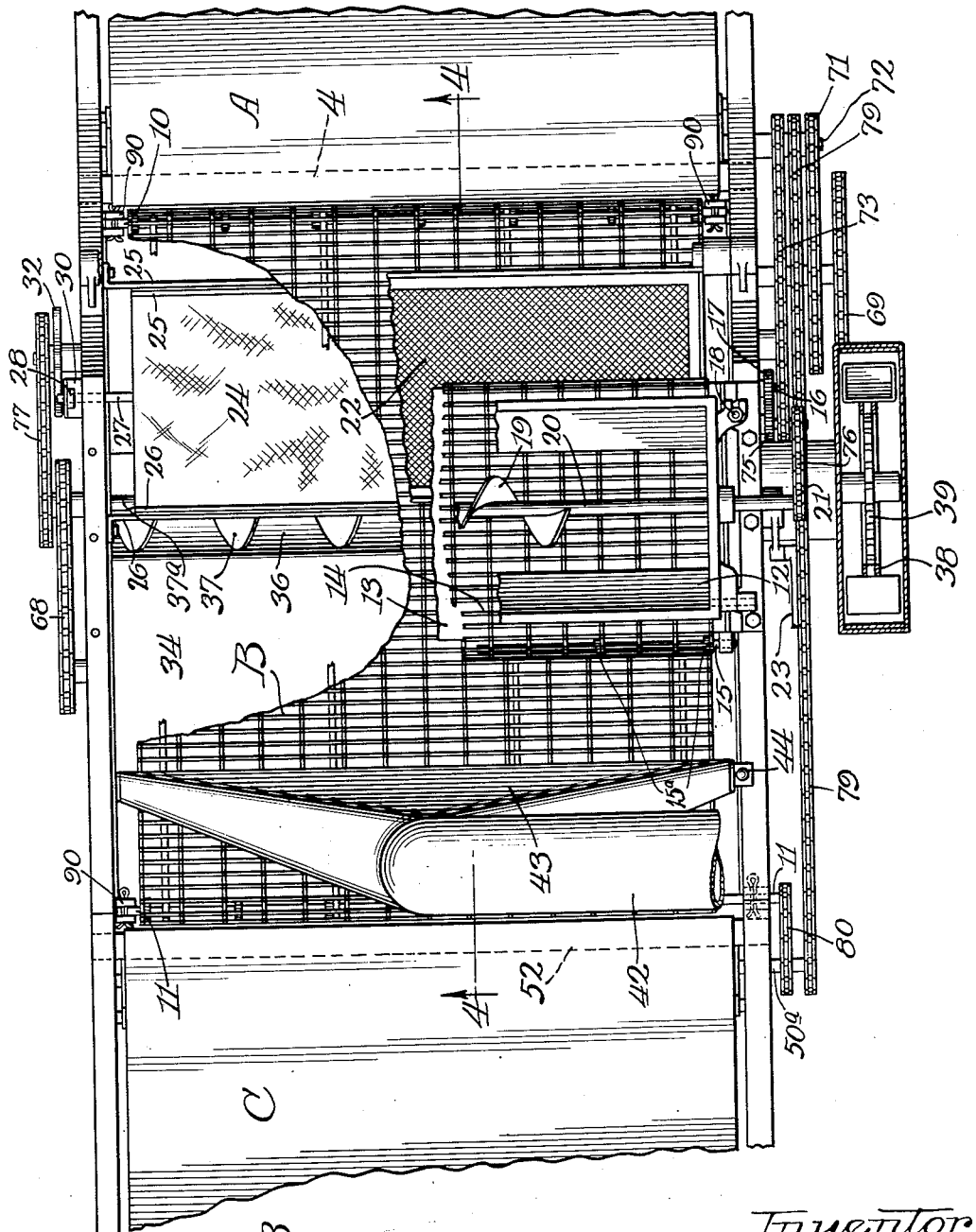

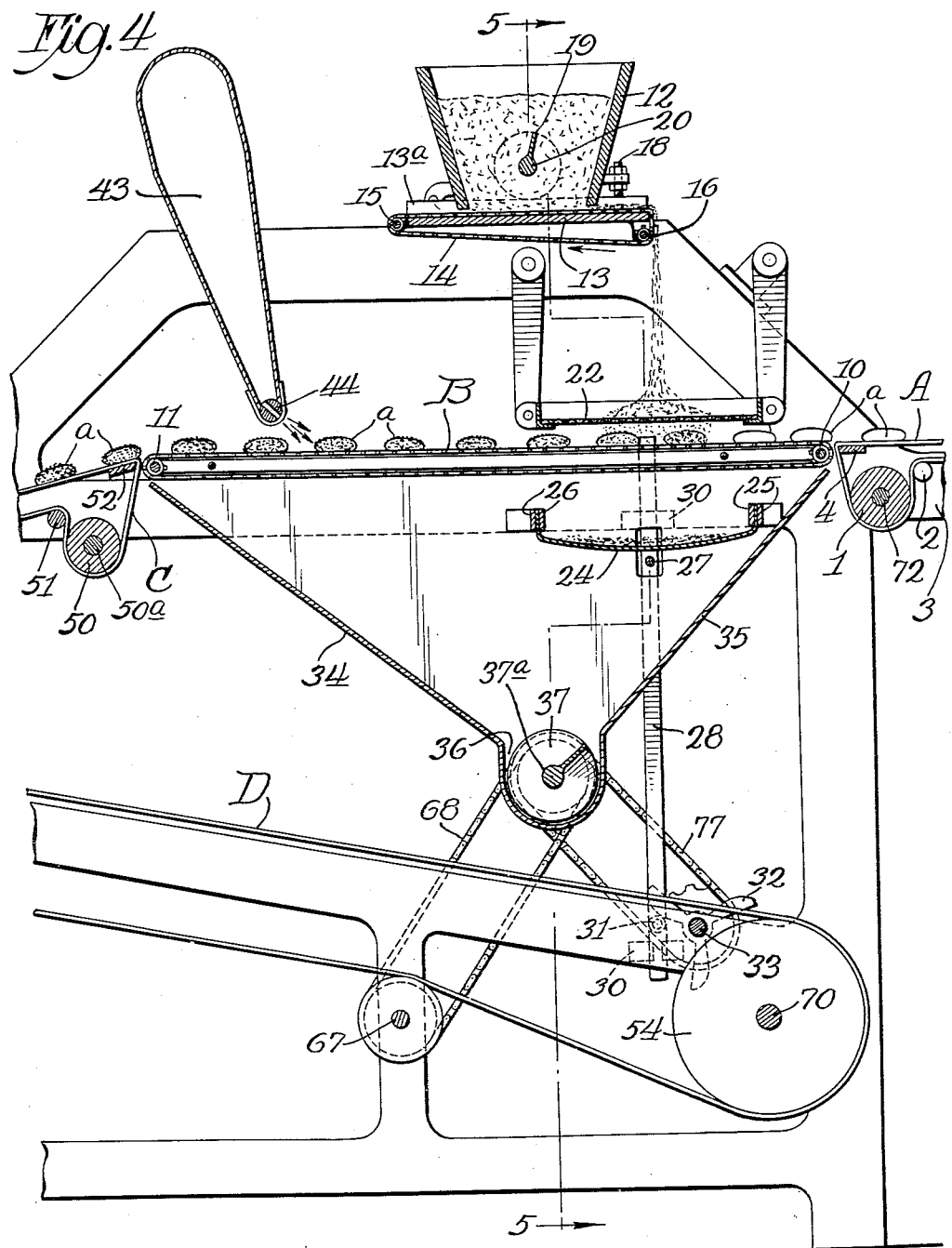

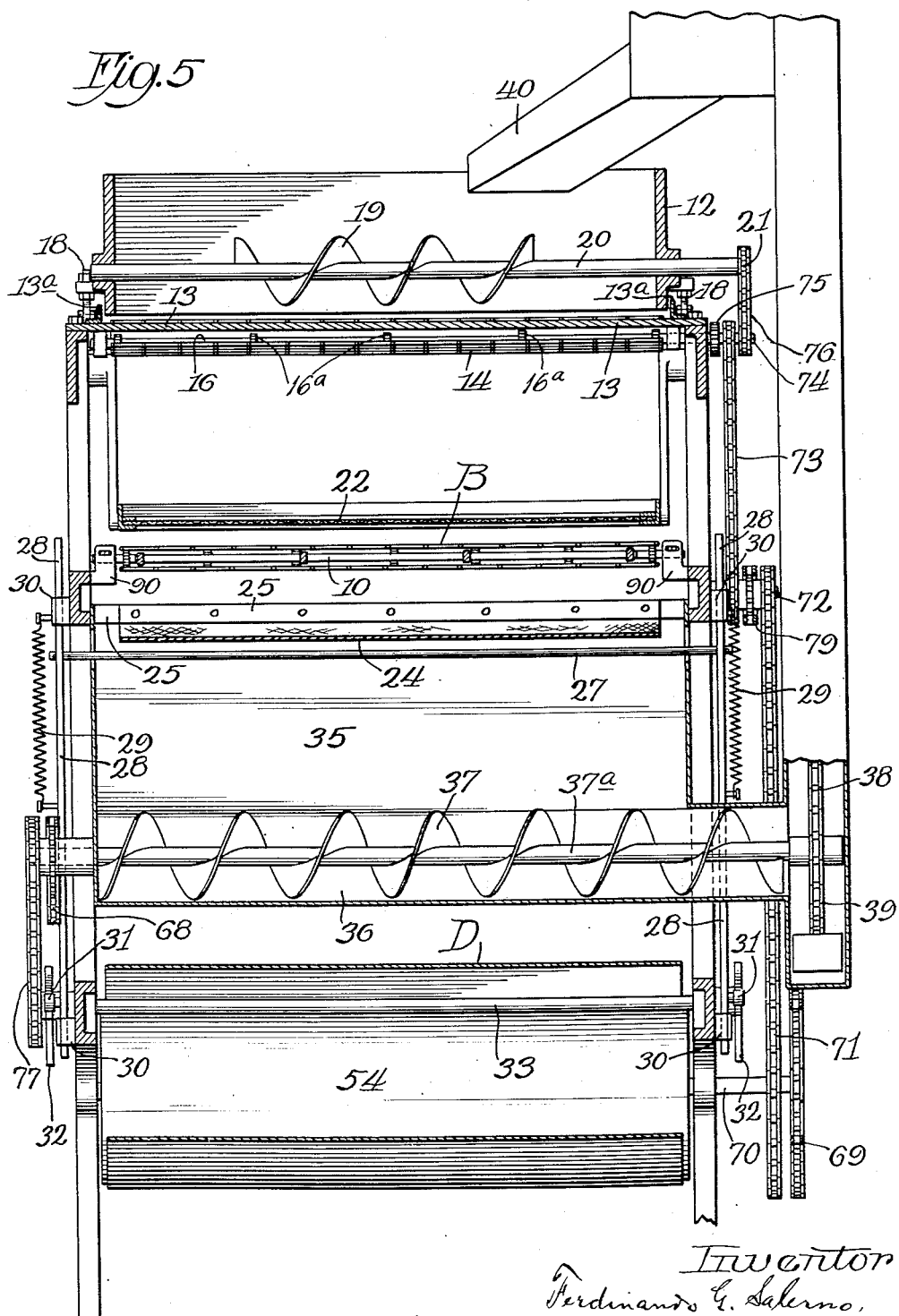

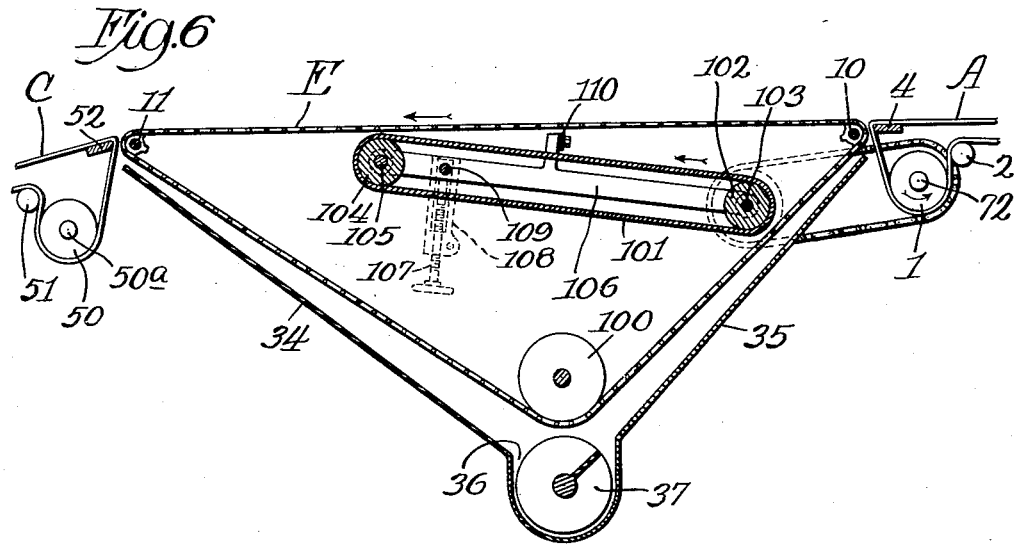
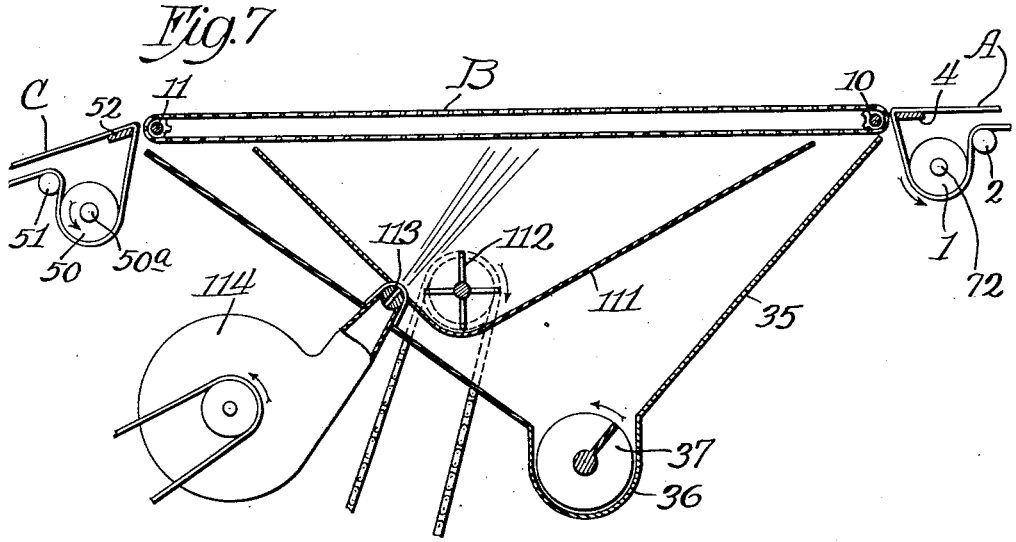

1,801,572

UNITED STATES PATENT OFFICE

FERDINANDO G. SALERNO, OF CHICAGO, ILLINOIS

MACHINE FOR APPLYING SHREDDED MATERIAL TO CONFECTION-COATED WAFERS AND THE LIKE

Application filed September 23, 1929. Serial No. 394,605.

My invention relates to a machine designed to apply a top and bottom coating of granular, shredded, or like fragmentary dry material to wafers or cakes which have previously been coated, either on their top faces alone, or on both their top and bottom faces, with a covering of a semi-liquid viscous confection, such as white or colored icing, jelly or a chocolate paste, while such coating of confection is still moist and adhesive. The cakes, preliminarily coated with the confection by a suitable coating or enrobing machine which need not here be described, are delivered in successive rows to the receiving belt of the machine which constitutes my present invention. My prior Letters Patent, No. 1,514,345, granted to me on November 4, 1924, and No. 1,627,577, granted to me on May 10th, 1927, relate to machines which are designed and adapted to accomplish in part the same results as the present machine and in many respects the construction of the machines described in said patents are similar.

The object of the present invention is the production of a new and improved coating machine having new and desirable features not found in my former machines. One novel feature of my present machine relates to a simplified mechanism for depositing a shower of the shredded material on the top of the wafers, and another novel feature relates to a mechanism for coating the bottom faces of the wafers with the shredded material as they pass through the machine. Other novel and advantageous features of construction incidental to the foregoing and designed to facilitate accomplishment of the ends in view will be apparent from the description of the machine hereinafter contained, the essential elements of my invention being more particularly pointed out in the appended claims.

In the accompanying drawings, Figure 1 is an elevation of what will be termed the left side of the machine;

Fig. 2 is an elevation of the left end of the supply hopper;

Fig. 3 is a top plan view of the central portion of the machine, certain parts being broken away to illustrate parts below them;

Fig. 4 is a vertical section in a plane indicated by the line 4—4 of Fig. 3, looking in the direction indicated by the arrows;

Fig. 5 is a vertical cross section of the machine in a plane indicated by the dotted line 5—5 of Fig. 4;

Fig. 6 is a view of a portion of the machine, illustrating a modified form of mechanism for applying the granulated material upwardly against the bottom side of the wafers, and Fig. 7 is a similar view of the same portion of the machine, illustrating still another form of mechanism for the same purpose.

Like reference characters indicate like parts in all the figures of the drawing.

Proceeding now to a detailed description of the machine, the rows of cakes or wafers $a$ to be treated, freshly coated with icing, or other confection are received in rows at what will be termed the front end of the machine upon a receiving belt A engaging a driving roller 1 and an idler roller 2 mounted in a pivoted frame 3, and also engaging a rear cross-bar 4 and a front cross bar 5 forming parts of said frame—see Figs. 1 and 4. In treating cakes which are coated on top only, a canvas receiving belt may be employed, and in many cases is preferable, while in treating cakes which are coated both on top and bottom a wire mesh receiving belt is in many cases preferable, although it will be understood that in some instances a canvas belt may be used for both purposes, and likewise in some instances a wire belt may be so used. To enable either form of belt to be used, and provide for use of the best form in any particular case, I prefer to make the frame 3 and parts carried by it removable and interchangeable so that a frame carrying a canvas receiving belt may be substituted for one carrying a wire meshed belt, and vice versa.

From the receiving belt the cakes to be treated pass to an endless wire mesh conveyor belt B which engages a set of sprocket members carried by a front idler shaft 10 and a similar set of sprocket members carried by a rear driving shaft 11. These shafts 10 and 11, as shown (see Figs. 3 and 5) are removably mounted in bearing grooves formed in bearing brackets 90 secured to opposite sides of the machine frame and are held in place by cotter pins, to provide for removal of the shafts and belt for the purpose of cleaning them, and to permit the substitution of a different belt. In advance of a detailed description it may here be explained that the shredded material is applied to the cakes while traveling upon this wire-meshed belt, after which they pass to a transfer belt C, and thence to trays upon a delivery belt D, from which they are removed by attendants of the machine.

The transfer belt C, as shown, is arranged to engage a driving roller 50, an idler roller 51, a front edge-bar 52, and a rear edge bar 53. The delivery belt D is arranged to engage a driving drum 54 and a front roller 55.

The mechanism for ditsributing the shredded material upon the coated cakes as they pass through the machine includes a supply hopper 12 arranged above the meshed conveyor belt B, which has an open bottom and is supported above a plate 13 over which is arranged to travel the upper stretch of a meshed feed belt 14 engaging sprockets 15ª upon a rear idler shaft 15, and similar sprockets 16ª carried by a front shaft which is equipped at its left end with a pinion 17 through which it is driven, see Figs. 3, 4 and 5.

The top of the plate or table 13 is provided with vertical top ribs or flanges 13ª, adjacent to and overlapping the end walls of the hopper 12, and the upper stretch of the meshed distributing belt travels between these flanges 13ª over the top of the plate through the bottom of the hopper from the rear pivoted side of the hopper box toward the front adjustable side, thus dragging the material in its path over the front edge of the plate, where it falls downwardly to the parts of the machine therebelow.

To enable the feed belt 14 to be cleaned and also to provide for adjustment of the front edge of the hopper with respect to the plate 13, and thereby vary the rate at which the granular material is fed by the action of the feed belt, the hopper box is hinged at its rear opposite corners to lugs upon the plate 13 and is supported at its front opposite corners by threaded pivoted posts 18 equipped with adjusting nuts engaging lugs on said plate,—see Figs. 2, 3 and 4.

Within the hopper I have provided an agitating device which consists of a spiral blade 19 secured to a shaft 20 which is journaled in the ends of the hopper box and at one end is provided with a sprocket wheel 21 by means of which it is driven.

As before stated, the plate 13 is formed with (or may have rigidly secured to it) the pivot lugs which carry the hopper box, and also carries the bearings for the shafts 15 and 16, and the plate is arranged to be detachably secured to the machine frame, so that the hopper and feed belt and associated parts can be removed as a unit to permit access to parts of the machine lying below them.

As in my prior machine I employ a vibrating screen 22 in the path of material fed from the hopper, hung upon rock arms, and vibrated by a pitman 23 so as to sprinkle and distribute the material evenly over the coated cakes passing beneath on the conveyor belt B.

Below the meshed conveyor belt B and in the path of surplus material falling between the cakes from the vibrating screen 22 above it, is arranged a novel mechanism I have devised for applying the granular material to the bottom faces of cakes passing on said meshed belt. This mechanism includes a loosely hung canvas apron 24 extending across the machine underneath the belt and secured along its front and rear edges between pairs of clamping bars 25—25 and 26—26 fixed to the framework of the machine. Centrally below the apron and extending transversely of the machine is arranged a knocker rod 27 secured near its opposite, projecting ends to a pair of opposite vertical slide rods 28—28 stressed upwardly by springs 29—29 secured at their lower ends to said rods and anchored to the machine frame at their upper ends. The rods are mounted for sliding movement in guide blocks 30 secured to the machine frame and are severally equipped with cam rollers 31 near their lower ends arranged to cooperate with a pair of similar rotary cams 32 fixed to a cam shaft 33 extending transversely of the machine frame and journaled therein. In the present instance each cam 32 is formed with three similar radially arranged cam faces so that the sliding knocker frame (consisting of the knocker rod 27 and connected slide rods 28) is vibrated three times at each revolution of the cam shaft. The cam faces are arranged to put the springs under tension as they force the slide rods downwardly and it will readily be understood that as each pair of cam faces pass out of engagement with the rollers on the rods, the frame will spring quickly upward until the projecting ends of the cross-bar 27 brings up against the upper guide blocks 30,—which are arranged to limit their upward movement,—striking the apron 24 sharply and throwing the material gathered therein upwardly against the bottom faces of the cakes above the apron.

The surplus material passing through the meshed conveyor B and around the edges of the apron 24 is directed by the inclined sides 34 and 35 of a collecting hopper to a transverse conveyor trough 36 in which is a spiral conveyor 37 which transfers the material to the lower end of a bucket elevator consisting of an endless sprocket chain 38 engaging a sprocket wheel 39 on the conveyor shaft and an idler upper sprocket wheel, the chain being equipped with buckets arranged to elevate the material and discharge it into a return chute 40 which empties it into the supply hopper.

A blower mechanism is provided consisting of a fan blower 41 arranged to form a blast of air through a pipe 42 and blower box 43 having an adjustable jet member 44 arranged to discharge a sheet of air angularly against the tops of the cakes to which the shredded material has been applied for the purpose of blowing away surplus material and facing adherent material more firmly into the coating of viscous confection.

While the machine may be driven by any suitable motor, and various connections for operating the parts properly may be employed, I have shown in the drawings suitable actuating connections which will briefly be described. To the electric motor 60 is geared a commercially well-known variable-speed power-transmitting device known as the Reeves variable-speed transmission having a pulley 61 eccentrically connected to the pitman 23 before mentioned, whereby the screen 22 is vibrated,—see Fig. 1. Through reducing gears 62, 63, 64, 65 and 66. connected to the driven shaft 61ª of the Reeves variable-speed transmission, a through shaft 67 is driven, and this through shaft is arranged to drive the shaft 37ª of the spiral conveyor 37 by means of a sprocket chain 68 engaging sprocket wheels secured severally to the shaft 67 and the conveyor shaft 37ª at the left side of the machne. The elevator, it will be remembered is actuated by the sprocket wheel 39 secured to the spiral conveyor shaft.

The shaft 37ª of the conveyor is also used to drive the cam shaft 33 through a sprocket chain 77 which engages sprocket wheels fixed severally to the shafts 37ª and 77 at the left side of the machine,—see Figs. 3 and 4.

The driving drum 54 of the delivery belt D is actuated from the shaft 67 before mentioned, by means of a sprocket chain 69 engaging a sprocket wheel fixed to said shaft and a sprocket wheel fixed to the shaft 70 upon which the drum is mounted.

The receiving belt A is actuated from said shaft 70 by means of a sprocket chain 71 engaging a sprocket wheel on said shaft and also engaging a sprocket wheel fixed to the shaft, marked 72, to which the driving roller 1 of said belt is secured, and which serves also to actuate various other parts of the machine.

The transfer belt C is actuated by a sprocket chain 79 at the left side of the machine engaging a sprocket wheel fixed to the shaft 72 and also a sprocket wheel fixed to the shaft 50ª upon which the driving roller engaged by said belt is journaled. The wire-mesh conveyor belt B is actuated through the shaft 50ª, just mentioned, by means of a sprocket chain 80 engaging a sprocket wheel on said shaft 50ª and also a sprocket wheel on the driving shaft 11 to which the sprocket members engaging said conveyor belt are secured.

The shaft 72 also serves to actuate the wire-mesh feed belt 14 through a sprocket chain 73 engaging a sprocket wheel on said shaft 72 and a second sprocket wheel fixed to a steel shaft 74 which is equipped with a pinion 75 meshing with the pinion 17 on the through shaft 16 which carries the sprockets for driving said feed belt. The stub shaft 74 just mentioned also actuates the agitator 19 by means of a sprocket chain 76 engaging sprocket wheels fixed severally to said shaft 74 and the shaft 20 which carries the agitator blade.

The blower may conveniently be actuated by a belt 78, arranged to engage pulleys on the shaft of the motor and the shaft of the blower, as illustrated in Fig. 1.

In Fig. 6 I have shown a different mechanism for applying the granular material to the lower side of top and bottom coated wafers pressing through the machine on the wire-mesh conveyor belt E, which replaces the conveyor belt B heretofore described, and which is of similar construction and similarly actuated, but differs in that its lower or return section passes downwardly around an idler roller 100 to provide space thereabove to accommodate an endless canvas belt 101 engaging a driving roller 102 fixed to a shaft 103 journaled in the side members of the machine, and also engaging an idler roller 104 mounted on a shaft 105 forming the rear cross member of an angularly adjustable frame consisting of such cross member and a pair of side arms 106 pivoted on the shaft 103. The top section of the belt 101 is arranged to travel rearwardly and the distance of its rear loop from the conveyor belt E above it may be regulated by an adjusting screw 107 threaded in a block 108 pivoted on the machine frame and cooperating with a cross rod 109 connecting the arms 106 of the belt-carrying frame. The side members of the belt-carrying frame are also connected by a scraper bar 110 arranged to level off the bed of granular material deposited on the front end of the belt 101 as the surplus material falls between the cakes passing through the machine on the conveyor belt E. The belt 101 is slightly inclined with reference to the horizontal conveyor belt E, and both belts are arranged to travel at the same speed so that as the leveled, uniformly thick bed of granular material approaches the rear end of its travel on the upper section of the belt 101 it lifts the material into contact with the coated cakes and causes it to adhere to them.

The roller 102 may be actuated by any suitable connection as, for instance, by a sprocket chain connection with shaft 72.

In Fig. 7 I have shown a different means for applying the granular material to the under faces of cakes on the conveyor belt B, employing a collecting pan 111 underneath said belt in which is arranged a rotating paddle wheel 112 the blades of which are arranged to throw the material collecting at the rounded bottom of the trough into the path of a sheet of air the linear jet orifice of the nozzle 113 connected with a blower 114. The material is thus blown against the coated lower faces of the wafers on the belt B, and adheres to them.

I claim:

1. In a machine of the character described, a meshed conveyor belt arranged to transport wafers coated on both sides, means above said belt for sprinkling comminuted material upon the upper faces of wafers on said belt, means for collecting surplus material passing through said belt, and means for applying said collected material directly through said belt from below to the lower faces of wafers upon said belt.

2. In a machine of the character described, a meshed conveyor belt arranged to transport wafers coated on both sides, means above said belt for sprinkling comminuted material upon the upper faces of wafers on said belt, means for collecting surplus material passing through said belt, and means for throwing said collected material against the lower faces of wafers upon said belt.

3. In a machine of the character described, a meshed conveyor belt arranged to transport wafers coated on both sides, means above said belt for sprinkling comminuted material upon the upper faces of wafers on said belt, a fabric apron below said meshed belt in the path of material distributed by said material-sprinkling means, and a vibrating member below said apron arranged to strike said apron and throw material thereon upwardly against wafers on said belt.

4. In a machine of the character described, a meshed conveyor belt arranged to transport wafers coated on both sides, means above said belt for sprinkling comminuted material upon the upper faces of wafers on said belt, a fabric apron below said meshed belt in the path of material distributed by said material-sprinkling means, and a vertically reciprocating frame having a cross member extending transversely of the machine below said apron arranged to strike said apron and throw material thereon upwardly against wafers on said belt.

5. In a machine of the character described, a meshed conveyor belt arranged to transport wafers coated on both sides, means above said belt for sprinkling comminuted material upon the upper faces of wafers on said belt, a fabric apron below said meshed belt in the path of material distributed by said material-sprinkling means, a vertically-reciprocable upwardly spring-stressed frame having a cross member extending transversely of the machine below said apron, and means for intermittently depressing said frame and releasing it at the bottom of its stroke.

6. In a machine of the character described, a meshed conveyor belt arranged to transport wafers coated on both sides, means above said belt for sprinkling comminuted material upon the upper faces of wafers on said belt, a fabric apron below said meshed belt in the path of material distributed by said material-sprinkling means, a vertically-reciprocable upwardly spring-stressed frame having a cross member extending transversely of the machine below said apron, said frame including a member arranged to cooperate with a stop member on the machine frame arranged to limit its upward movement, and means for intermittently depressing said frame and releasing it at the bottom of its stroke.

7. In a machine of the character described a meshed conveyor belt arranged to transport wafers coated on both sides, means above said belt for sprinkling comminuted material upon the upper faces of wafers on said belt, a fabric apron below said meshed belt in the path of material distributed by said material-sprinkling means, a vertically-reciprocable upwardly spring-stressed frame having a cross member extending transversely of the machine below said apron, and having vertical side members slidingly mounted in the machine frame equipped with cam members, and a pair of cams arranged to simultaneously cooperate with said cam members for intermittently depressing said frame and releasing it at the bottom of its stroke.

8. In a machine of the character described a meshed conveyor belt arranged to transport wafers coated on both sides, means above said belt for sprinkling comminuted material upon the upper faces of wafers on said belt, a fabric apron below said meshed belt in the path of material distributed by said material-sprinkling means, a vertically-reciprocable upwardly spring-stressed frame having a cross member extending transversely of the machine below said apron, and having vertical side members slidingly mounted in the machine frame and equipped with cam rollers, and a rotating cam shaft equipped with a pair of similar cams arranged to simultaneously cooperate with said cam rollers for intermittently depressing said frame and releasing it at the bottom of its stroke.

9. In a machine of the character described a meshed conveyor belt arranged to transport wafers coated on both sides, means above said belt for sprinkling comminuted material upon the upper faces of wafers on said belt, a fabric apron below said meshed belt in the path of material distributed by said material-sprinkling means, a vertically-reciprocable upwardly spring-stressed frame having a cross member extending transversely of the machine below said apron, and having vertical side members slidingly mounted in the machine frame and equipped with cam members, said frame being provided with opposite stop portions arranged to cooperate with stop members at the sides of the machine frame to limit its upward movement, and a pair of cams arranged to simultaneously cooperate with said cam members for intermittently depressing said frame and releasing it at the bottom of its stroke.

10. In a machine of the character described, mechanism according to claim 8 in which the cams on the cam shaft are formed with a plurality of radially arranged cam faces.

11. In a machine of the character described, means for distributing granular material including a hopper box, a horizontal plate extending therebelow, the front and rear sides of said hopper being spaced above said plate, and an endless driven meshed distributing belt having its upper stretch arranged to travel over the upper face of said plate and its lower return stretch extending therebelow.

12. In a machine of the character described, means for distributing granular material including a hopper box, a horizontal plate extending therebelow, the hopper being pivoted at one side and adjustably supported at the other side and its front and rear sides being spaced above said plate, and an endless driven meshed distributing belt having its upper stretch arranged to travel over said plate from the pivoted side of the box towards the adjustable side and having its lower return stretch arranged below said plate.

13. In a machine of the character described, means for distributing granular material including a stationary horizontal plate provided with upwardly extending parallel flanges near its opposite ends, a hopper box above said plate and pivoted thereto at one side and adjustably supported by said plate at its other side, the lower edges of the sides and ends of said hopper lying in a plane above said plate and said plate flanges being arranged adjacent to and overlapping the end walls of said hopper, and an endless driven meshed distributing belt between said plate flanges having its upper stretch arranged to travel over said plate from the pivoted side of the box towards the adjustable side and having its lower return stretch arranged below said plate.

14. In a machine of the character described, means for distributing granular material including a stationary horizontal plate provided with upwardly extending parallel flanges near its opposite ends, a hopper box above said plate and pivoted thereto at one side and adjustably supported by said plate at its other side, the lower edges of the sides and ends of said hopper lying in a plane above said plate and said plate flanges being arranged adjacent to and overlapping the end walls of said hopper, and an endless driven meshed distributing belt between said plate flange engaging rollers journaled in bearings secured to said plate and having its upper stretch arranged to travel over said plate from the pivoted side of the box towards the adjustable side and having its lower return stretch arranged below said plate, said plate and connected parts being detachable from the machine frame as a unit.

15. A machine of the character described, having means for distributing granular material including a horizontal plate and a hopper secured to said plate and an endless wire-mesh distributing belt engaging rollers journaled in bearings secured to said plate and arranged to travel over the upper face of said plate through the bottom of said hopper, said plate and hopper and belt being detachably secured as a unit to the machine frame.

16. A machine of the character described, having means for distributing granular material including a horizontal plate and a hopper secured to said plate and an endless wire-mesh distributing belt engaging rollers journaled in bearings secured to said plate and arranged to travel over the upper face of said plate through the bottom of said hopper, said plate and hopper and belt being detachably secured as a unit to the machine frame and also having a wire-mesh belt below said distributing means engaging rollers removably mounted in bearings upon the machine frame.

17. In a machine of the character described, a meshed conveyor belt arranged to transport wafers coated on both sides, means above said belt for sprinkling comminuted material upon the upper faces of wafers on said belt, means for collecting surplus material passing through said belt, and means for applying said collected material directly through said belt from below to the lower faces of wafers upon said belt including blower means arranged to blow said collected material upwardly.

18. In a machine of the character described, a meshed conveyor belt arranged to transport wafers coated on both sides, means above said belt for sprinkling comminuted material upon the upper faces of wafers on said belt, a collecting pan arranged to collect material passing through said belt, a paddle wheel in said pan, and a blower provided with a nozzle having a linear jet orifice arranged to blow material thrown up by said paddle wheel upwardly through said belt to the lower faces of wafers thereupon.

19. In a machine of the character described, a meshed conveyor belt arranged to transport wafers coated on both sides, means above said belt for sprinkling comminuted material upon the upper faces of wafers on said belt, an impervious endless belt below the upper stretch of said meshed belt having an inclined upper stretch arranged to collect surplus material passing through said meshed belt, the upper stretches of said meshed belt and said impervious belt traveling in the same direction and the leading higher end of the top stretch of said impervious belt being arranged in close proximity to the meshed belt above it, whereby said collected material on said impervious belt will be applied directly through the orifices of said meshed belt to the lower faces of wafers upon said belt.

In testimony whereof, I have subscribed my name.

FERDINANDO G. SALERNO.